US012608843B2

(12) United States Patent
Tokuse

(10) Patent No.: US 12,608,843 B2
(45) Date of Patent: Apr. 21, 2026

(54) SELF-POSITION ESTIMATION DEVICE

(71) Applicants: DENSO CORPORATION, Kariya-city (JP); TOYOTA JIDOSHA KABUSHIKI KAISHA, Toyota (JP); MIRISE Technologies Corporation, Nisshin (JP)

(72) Inventor: Akira Tokuse, Nisshin (JP)

(73) Assignees: DENSO CORPORATION, Kariya-city (JP); TOYOTA JIDOSHA KABUSHIKI KAISHA, Toyota (JP); MIRISE Technologies Corporation, Nisshin (JP)

( * ) Notice: Subject to any disclaimer, the term of this patent is extended or adjusted under 35 U.S.C. 154(b) by 0 days.

(21) Appl. No.: 18/813,143

(22) Filed: Aug. 23, 2024

(65) Prior Publication Data

US 2025/0104278 A1 Mar. 27, 2025

(30) Foreign Application Priority Data

Sep. 26, 2023 (JP) ................................. 2023-162459

(51) Int. Cl.
| | |
|---|---|
| *G06T 7/73* | (2017.01) |
| *G06T 15/20* | (2011.01) |
| *G06T 17/00* | (2006.01) |

(52) U.S. Cl.
CPC .............. *G06T 7/75* (2017.01); *G06T 15/205* (2013.01); *G06T 17/00* (2013.01); *G06T 2207/30252* (2013.01)

(58) Field of Classification Search
CPC ......... G06T 7/75; G06T 15/205; G06T 17/00; G06T 2207/30252
USPC ........................................................ 348/148
See application file for complete search history.

(56) References Cited

U.S. PATENT DOCUMENTS

2020/0309963 A1 10/2020 Kato et al.

FOREIGN PATENT DOCUMENTS

JP 2020-061048 A 4/2020

OTHER PUBLICATIONS

Zhou et al., "Ground Plane based Absolute Scale Estimation for Monocular Visual Odometry," IEEE Transactions, arXiv preprint arXiv; 1903.00912v1, Mar. 2019, pp. 1-12.

*Primary Examiner* — Justin W Rider
(74) *Attorney, Agent, or Firm* — Posz Law Group, PLC

(57) ABSTRACT

A self-position estimation device is adapted to a movable object having a camera and a communication device. The camera takes an image of surrounding of the movable object. The self-position estimation device includes a feature acquisition unit, a scale calculation unit, and a self-position estimation unit. The feature acquisition unit acquires an image feature point. The scale calculation unit calculates an actual scale of the image. The self-position estimation unit estimates a self-position of the movable object based on the image feature point and the actual scale. The scale calculation unit acquires object information and an object image feature point, and calculates the actual scale based on the acquired object information and a feature value of the acquired object image feature point.

19 Claims, 5 Drawing Sheets

SELF-POSITION ESTIMATION DEVICE

CROSS REFERENCE TO RELATED APPLICATION

This application is based on Japanese Patent Application No. 2023-162459 filed on Sep. 26, 2023, the disclosure of which is incorporated herein by reference.

TECHNICAL FIELD

The present disclosure relates to a self-position estimation device.

BACKGROUND

A vehicle may have a self-position estimation device that utilizes an image by a monocular camera adapted to the vehicle. Images captured by a monocular camera may have an indefinite actual scale, which may degrade the accuracy of self-position estimation.

SUMMARY

The present disclosure describes a self-position estimation device including a feature acquisition unit, a scale calculation unit, and a self-position estimation unit.

DETAILED DESCRIPTION

Figure 1:
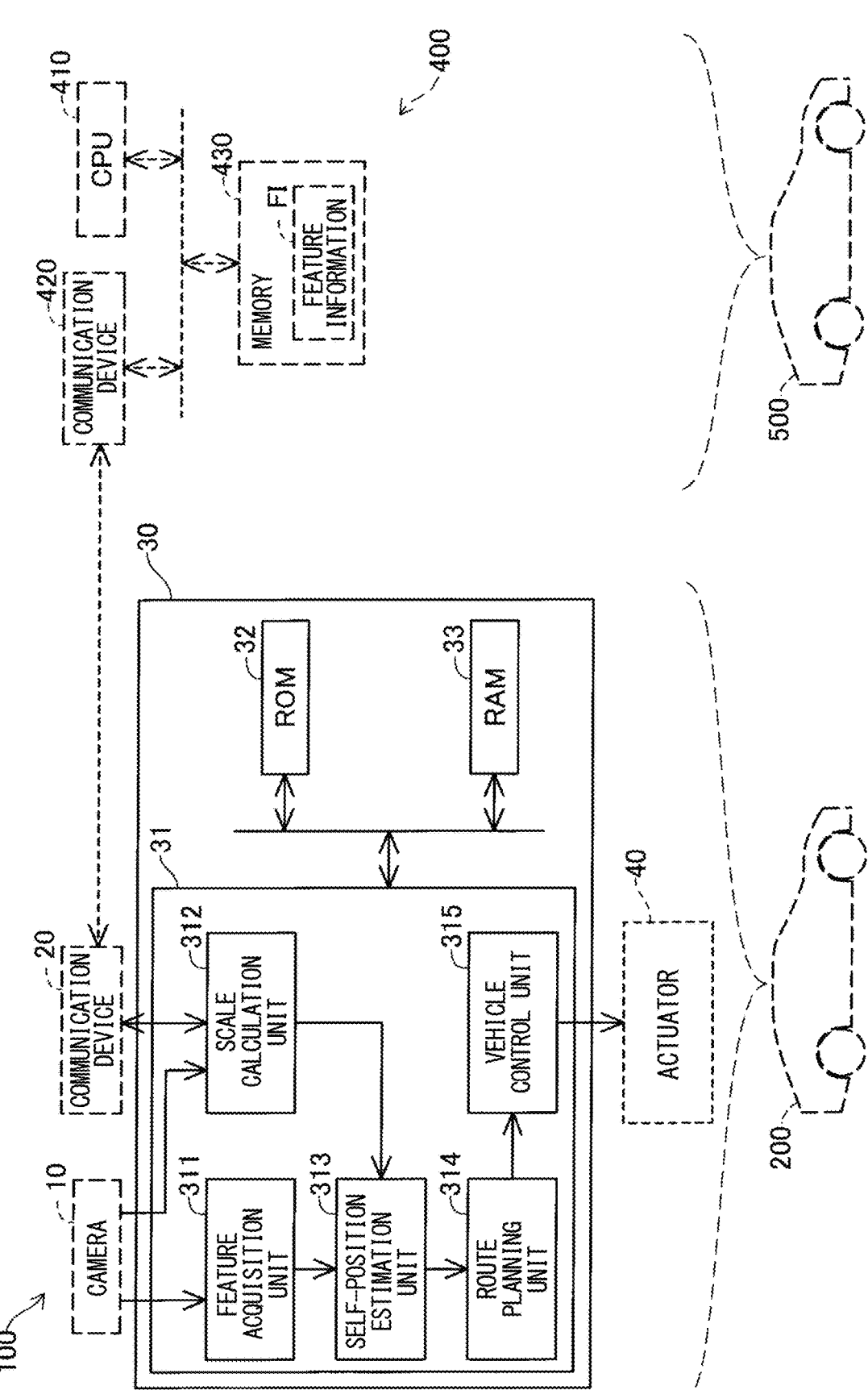
FIG. 1 is a block diagram showing a schematic configuration of a controller according to a first embodiment.

A self-position estimation device included in a vehicle may suppress a decrease in the accuracy of self-position estimation by using positioning information of the own vehicle received by a Global Navigation Satellite System (GNSS) receiver installed in the own vehicle, the positioning information of another vehicle received by a GNSS receiver installed in the other vehicle and acquired through inter-vehicle communication, and the feature points of landmarks included in a pre-stored local map. The accuracy of self-position estimation may be suppressed by using the positioning information of the other vehicle received by the GNSS receivers and feature points of landmarks included in a pre-stored local map.

However, the self-position estimation device included in the vehicle may degrade the accuracy of self-position estimation in environments where the GNSS receivers cannot receive positioning information sufficiently, such as in tunnels and urban areas. In addition, it is necessary to create and store a database of landmark feature points in advance, which increases burden on the storage capacity of the memory device. Such situations are not limited to vehicles, but may also be applied to a self-position estimation device adapted to any movable object, such as an aircraft or robot.

According to an aspect of the present disclosure, a self-position estimation device is adapted to a movable object having a camera and a communication device. The camera takes an image of surrounding of the movable object. The self-position estimation device includes a feature acquisition unit, a scale calculation unit, and a self-position estimation unit. The feature acquisition unit acquires an image feature point. The scale calculation unit executes calculation of an actual scale of the image. The self-position estimation unit estimates a self-position of the movable object based on the image feature point and the actual scale. The scale calculation unit executes the calculation by: acquiring object information through the communication device from the external device; and calculating the actual scale based on a feature value of the object image feature point and the object information. The object information is information related to an object existing in the image. The external device is located at the surrounding of the vehicle.

According to such a configuration, the self-position estimation device calculates the actual scale based on the feature value of the object image feature point and the object information, and estimates the self-position based on the image feature point and the actual scale. Therefore, even though the movable object is under an environment where the GNSS receiver cannot sufficiently receive positioning information, it is possible to estimate the self-position based on the camera adapted to the movable object. Thus, it is possible to suppress a decrease in the accuracy of the self-position estimation. Since the object information is acquired from the external device, it is possible to suppress the compression of the memory storage of a memory device as compared with a configuration in which the database or the like of feature points of a landmark is preliminarily created and stored into the memory device.

First Embodiment

As illustrated in FIG. 1, a vehicle 200 includes a camera 10, a communication device 20, a controller 30 and an actuator 40. The vehicle 200 is a vehicle capable of performing an automatic operation, and it is possible that the mode of the vehicle 200 can be switched between the automatic operation and a manual operation. The automatic operation refers to an operation in which drive control, brake control, and steering control are automatically performed on behalf of an occupant. The manual operation refers to an operation in which the passenger performs operations for drive control such as depressing the accelerator pedal, brake control such as depressing the brake pedal, and steering control such as turning the steering wheel. The vehicle 200 may be any vehicle such as a battery electric vehicle (BEV), a hybrid electric vehicle (HEV), a fuel cell vehicle (FCV), a gasoline vehicle, and a diesel vehicle. The vehicle 200 may be equipped with various sensors that can be used to detect the position and attitude of the vehicle 200, such as a GNSS receiver, an inertial measurement unit (IMU), and a light detection and ranging (LiDAR) device. The attitude of the vehicle may also be referred to as a posture of the vehicle in the present disclosure.

The camera 10 captures the surrounding of the vehicle 200 to acquire an image. In the present embodiment, the camera 10 is a monocular camera that captures images of the front of the vehicle 200. In other words, the camera 10 is capable of capturing the views from the front of the vehicle 200. The camera 10 is not limited to the front of the vehicle 200, but may also capture images of the lateral side or rear side of the vehicle 200.

The communication device 20 communicates with an in-vehicle device 400 adapted to another vehicle 500 located in the vicinity of the vehicle 200, and acquires object information from the in-vehicle device 400. The object information refers to information about the vehicle 500 as an object included in the image captured by the camera 10. In the present embodiment, the vehicle 500 corresponds to another movable object in the present disclosure, and the in-vehicle device 400 corresponds to an external device in the present disclosure.

In the present embodiment, the in-vehicle device 400 has a CPU 410, a communication device 420, and a memory 430. The in-vehicle device 400 transmits the object information stored in the memory 430 in advance to the controller 30 from the communication device 420 according to the control by the CPU 410. The in-vehicle device 400 transmits the object information to the communication device 20, when, for example, the distance between the vehicle 500 and the vehicle 200 is less than a predetermined distance. In the present embodiment, the in-vehicle device 400 stores feature information FI as the object information into the memory 430 in advance. The feature information FI refers to information indicating the position of feature points corresponding to at least a portion of the vehicle 500 (hereinafter also referred to as "object feature points"), the feature value of each object feature point, and the type of feature algorithm used to calculate the feature values of each object feature point. For example, the in-vehicle device 400 stores, as the feature information FI, the coordinates of the feature points indicating the tail lamp portion of the vehicle 500 with respect to the center of gravity of the vehicle 500, the feature value of each of the feature points, and the type of feature algorithm used to calculate the feature values in advance. The feature information FI may also be referred to as feature point information. The feature algorithm may also be referred to as a feature extraction algorithm.

In the present embodiment, the in-vehicle device 400 stores in advance feature values calculated by types of feature algorithms for the object feature points, respectively. The types of feature algorithms for object feature points stored by the in-vehicle device 400 are described hereinafter. The in-vehicle device 400 determines with a scale calculation unit 312 which one of several types of feature algorithms to transmit as the feature information FI for each object feature point. Furthermore, as the feature information FI, the in-vehicle device 400 transmits to the communication device 20 a feature value calculated by a determined type of feature algorithm among several feature values for the object feature points. In the present embodiment, the in-vehicle device 400 receives the available feature algorithm transmitted by the scale calculation unit 312 described below, and transmits the feature information FI including the feature value calculated by any one type of feature algorithm available for the scale calculation unit 312 among several feature values.

The actuator 40 includes a drive device to accelerate the vehicle 200, a steering device to change the direction of the vehicle 200, and a braking device to decelerate the vehicle 200. The actuator 40 may further include an actuator for swinging the wipers of the vehicle 200 or an actuator for opening and closing the power windows of the vehicle 200.

The controller 30 estimates the self-position of the vehicle 200 using the object information acquired by the communication device 20 and images acquired by the camera 10.

The controller 30 corresponds to a self-position estimation device in the present disclosure. The controller 30 uses the estimated self-position to create a travel route and controls the actuator 40 to drive the vehicle 200 along the travel route.

In the present embodiment, the controller 30 is an ECU (Electronic Control Unit) having a CPU 31, a ROM 32, and a RAM 33. The CPU 31 functions as a feature point acquisition unit 311, the scale calculation unit 312, a self-position estimation unit 313, a route planning unit 314, and a vehicle control unit 315 by deploying and executing a program pre-stored in the ROM 32 to the RAM 33.

The feature point acquisition unit 311 acquires feature points that exist in images captured by the camera 10 (hereinafter also referred to as "image feature points") and calculates a feature value for each image feature point. The image feature points include not only feature points corresponding to the vehicle 500, but also feature points corresponding to, for example, buildings and roads, which are background portions of the image. The scale calculation unit 312 calculates the actual scale of the image captured by the camera 10. The term "actual scale" refers to the scale of length appearing in an image relative to the actual length in the real world. Each of the feature point acquisition unit 311 and the scale calculation unit 312 utilizes a predefined type of feature algorithm to perform the calculation of the feature value or the actual scale of the image feature points. In the present embodiment, the feature point acquisition unit 311 and the scale calculation unit 312 can use three types of feature algorithms, which are Scale Invariant Feature Transform (SIFT), Oriented FAST and Rotated BRIEF (ORB) and Speeded Up Robust Features (SURF).

The self-position estimation unit 313 estimates the self-position of the vehicle 200 using the feature value of the image feature point and the actual scale. The route planning unit 314 uses the estimated self-position to create a planned route, which is the route that the vehicle 200 is scheduled to travel. The vehicle control unit 315 controls the actuators 40 to drive the vehicle 200 along the created planned route. Specific processing by each functional unit will be described later.

Figure 2:
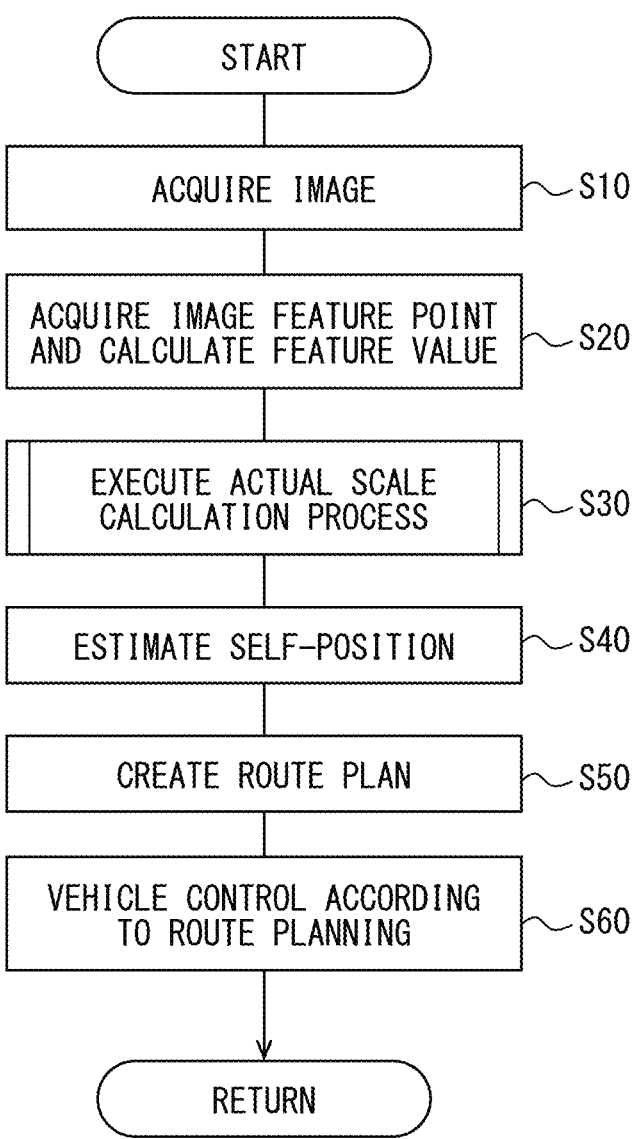
FIG. 2 is a flowchart showing a procedure of processing executed by the controller according to the first embodiment.

The controller 30 repeatedly executes a process shown in FIG. 2 while the controller 30 is in operation. In S10, each of the feature point acquisition unit 311 and the scale calculation unit 312 acquires an image captured by the camera 10. In FIG. 1, the image is acquired directly from the camera 10, but the image may also be acquired from the ROM 32 after being stored once in the ROM 32.

In S20 shown in FIG. 2, the feature point acquisition unit 311 acquires image feature points from the acquired image and calculates the feature value for each image feature point. In the present embodiment, the feature point acquisition unit 311 performs acquisition of the image feature points and calculation of the feature values using any one type of feature algorithm among the available feature algorithms.

Figure 3:
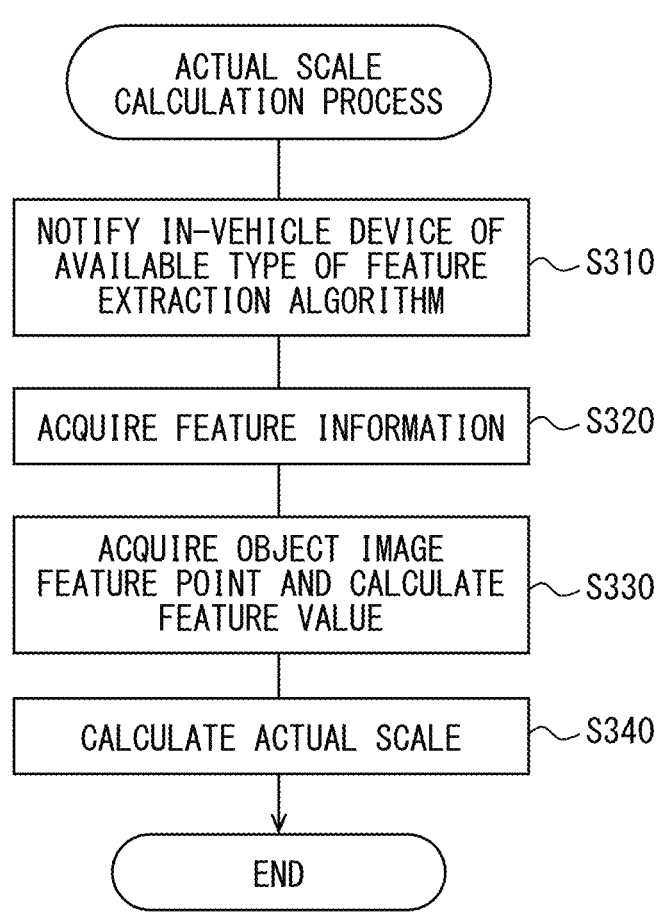
FIG. 3 is a flowchart showing a procedure of an actual scale calculation process according to the first embodiment.

In S30, the scale calculation unit 312 executes the actual scale calculation process shown in FIG. 3. In S310, the scale calculation unit 312 transmits the types of feature algorithms available to the in-vehicle device 400.

In S320, the scale calculation unit 312 acquires the feature information FI, which is acquired from the in-vehicle device 400 by the communication device 20. As described above, the in-vehicle device 400 transmits the feature information FI including the feature values calculated by any one type of feature algorithm available to the scale calculation unit 312, and the scale calculation unit 312 acquires the feature information FI. In FIG. 1, the feature information FI is acquired directly from the communication device 20, but it may be acquired from the ROM 32 after being stored once in the ROM 32 from the communication device 20.

In S330 shown in FIG. 3, the scale calculation unit 312 acquires from the image the feature points corresponding to the vehicle 500, which is the object corresponding to the feature information FI (hereinafter also referred to as "object image feature points"), and calculates the feature value for each object image feature point. In the present embodiment, the scale calculation unit 312 acquires the image feature points from the image. Furthermore, the scale calculation unit 312 performs matching between the acquired multiple image feature points and multiple object feature points indicated by the feature information FI, and acquires the image feature points that are similar to the position relationship of multiple object feature points or the feature values of object feature points as the object image feature points. In this case, the scale calculation unit 312 calculates the feature values of the image feature points and the object image feature points using the same type of algorithm as the feature algorithm indicated by the feature information FI.

In the present embodiment, when there are multiple vehicles in the image, the scale calculation unit 312 prioritizes selecting the vehicle to acquire object feature points. The scale calculation unit 312, for example, selects a vehicle that is closer to the vehicle 200. Furthermore, the scale calculation unit 312 may also select a vehicle with large movement distances of corresponding object feature points between consecutive images in a time series that have already been acquired, in other words, a vehicle with a high relative speed compared to the vehicle 200 or a vehicle that is travelling in the direction crossing in front of the vehicle 200. On the other hand, the scale calculation unit 312 may select a vehicle with small movement distances of corresponding object feature points between consecutive images in a time series that have already been acquired, in other words, a vehicle that is travelling in the same direction as the vehicle 200. The actual scale is not determined, so the aforementioned "distance from the vehicle 200" and "relative speed to vehicle 200" may be calculated in pixel units. By selecting a vehicle that prioritizes acquiring object feature points as described above, the number of object feature points used for calculating the actual scale, as described later, can be reduced, thereby suppressing the increase in computational load for calculating the actual scale.

In S340, the scale calculation unit 312 calculates the actual scale using the feature values of the object image feature points and the feature values of the object feature points. More specifically, the scale calculation unit 312 calculates the actual scale by calculating the ratio of a first distance and a second distance. The first distance is a distance between the object feature points indicated by the feature information FI, and the second distance is a distance between the image object feature points corresponding to the object feature points. The scale calculation unit 312 determines which object feature points each object image feature point corresponds to by evaluating the positional relationship between each object image feature point and each object feature point, as well as determining whether their respective feature values are in consistent.

In S40 shown in FIG. 2, the self-position estimation unit 313 estimates the self-position of the vehicle 200 using the acquired image feature points and the calculated actual scale. More specifically, the self-position estimation unit 313 uses image analysis techniques such as Structure from Motion (SfM) and Convolutional Neural Network (CNN) to calculate the three-dimensional position of each image feature point in pixel units from multiple consecutive images in time series. The scale calculation unit 312 converts the calculated three-dimensional position in the pixel unit to a three-dimensional position in the meter unit using the actual scale. This allows the scale calculation unit 312 to estimate the position, speed, and travelling direction of the vehicle 200 relative to the vehicle 500, signs and signals on the road, and buildings on the shoulder of the road that exist around the vehicle 200.

In S50, the route planning unit 314 creates a planned route using the estimated self-position of the vehicle 200. More specifically, the route planning unit 314 generates a short-term route plan, such as adjusting the distance between the vehicle 200 and the vehicle 500 and the travel position of the vehicle 200 within the travel lane, depending on the surrounding conditions of the vehicle 200, such as signals and distance from surrounding vehicles. Furthermore, the vehicle 200 is equipped with a GNSS receiver, which allows for the detection of the absolute position of the vehicle 200 at a certain point in the past based on positioning information. In such cases, the route planning unit 314 can also create a long-term route plan from the present absolute position of the vehicle 200, which is calculated based on the relative movement distance from the point where positioning information was lost, to a pre-set destination. The route plan is not limited to the travel route of the vehicle 200, but may also include information that specifies vehicle control, such as vehicle speed and travel direction of the vehicle 200 at various points on the travel route.

In S60, the vehicle control unit 315 controls the actuator 40 to drive the vehicle 200 according to the created route plan. The controller 30 repeats the process described above.

According to the controller 30 related to the first embodiment described above, the actual scale is calculated using the feature values of object image feature points and the object information, and the self-position is estimated using the image feature points and the actual scale. As a result, even in environments where GNSS receivers cannot receive positioning information sufficiently, it is possible to estimate self-position using the camera 10 mounted on a mobile device without relying on other sensors, and to suppress the degradation of self-position estimation accuracy. In addition, since the object information acquired from the in-vehicle device 400 is used, the storage capacity of the ROM 32 can be suppressed compared to a system in which, for example, a database of landmark feature points is created in advance and stored in the ROM 32.

Furthermore, by acquiring the feature information FI from the in-vehicle device 400, which includes the positions of multiple object feature points, the feature value of each object feature point, and the types of feature algorithms used to calculate the feature values, it becomes possible to easily calculate the actual scale using the feature values of the object image feature points indicated by the feature information FI and the feature values of the object feature points.

Second Embodiment

Figure 4:
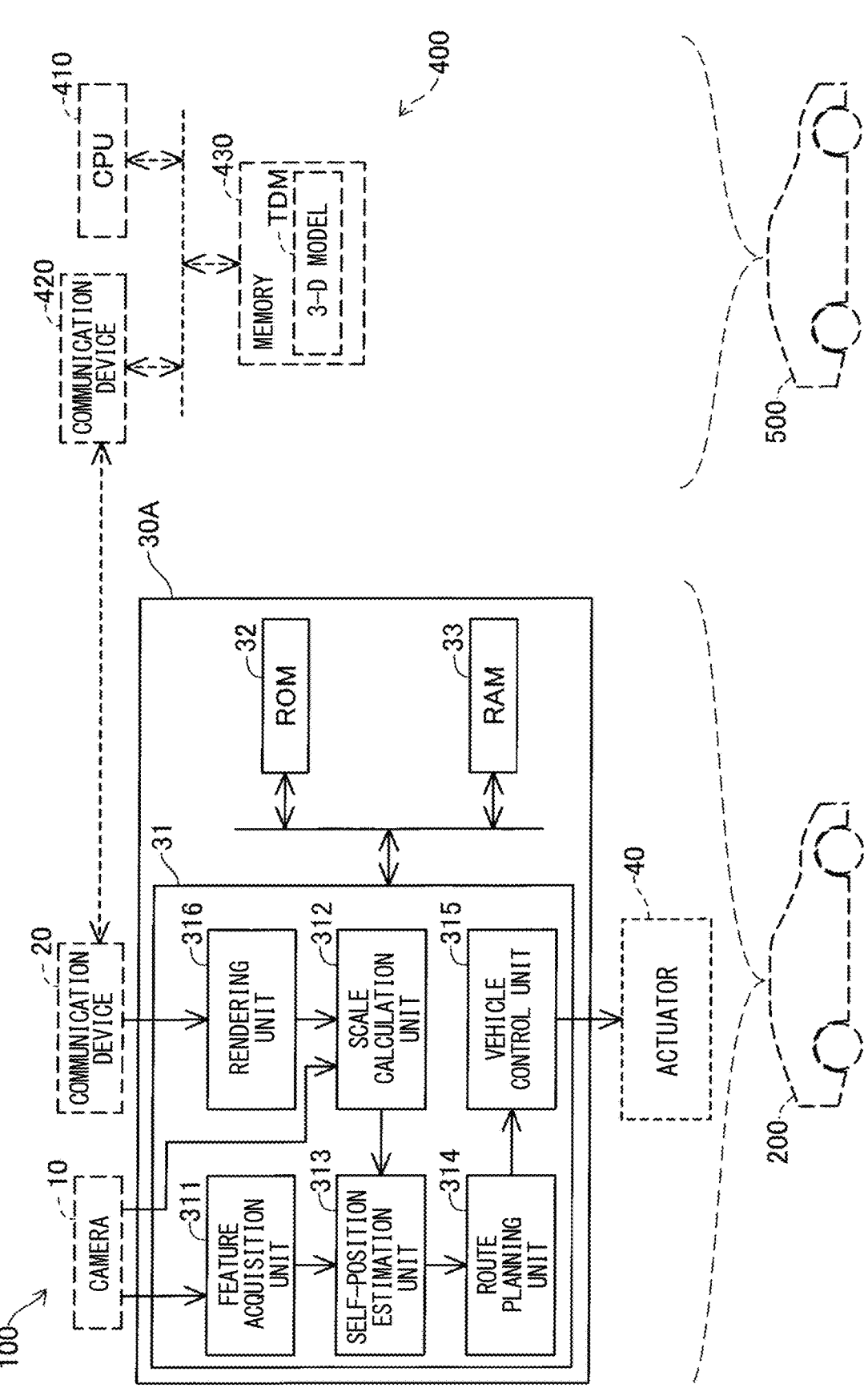
FIG. 4 is a block diagram showing a schematic configuration of a controller according to a second embodiment.
Figure 5:
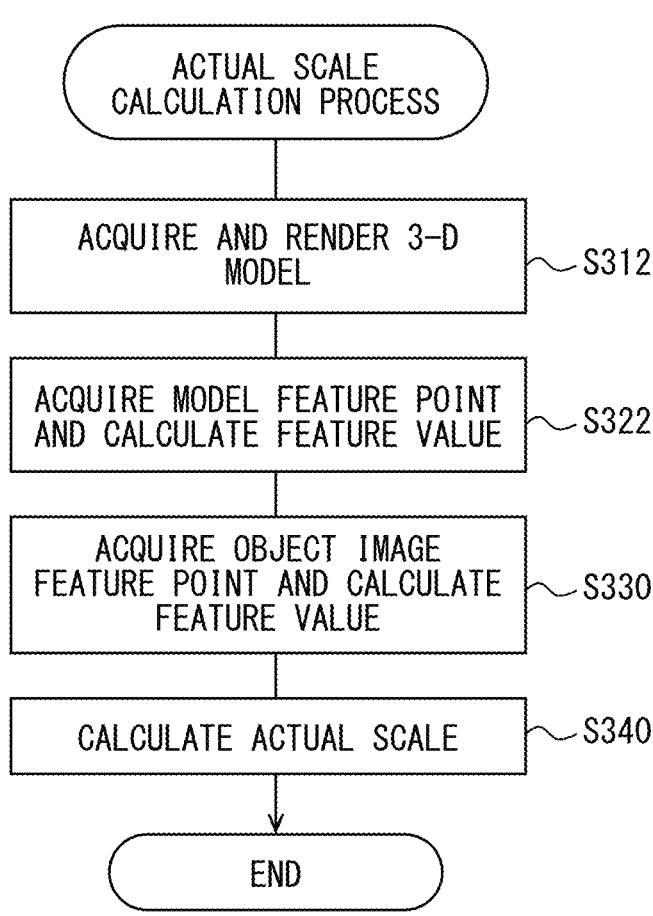
FIG. 5 is a flowchart showing a procedure of an actual scale calculation process according to the second embodiment.

A controller 30A according to a second embodiment differs from the controller 30 according to the first embodiment in that: the controller 30A further includes a rendering unit 316 as shown in FIG. 4; and the controller 30A executes S312 and S322 shown in FIG. 5 instead of S310 and S320 shown in FIG. 3 in the actual scale calculation process. Since the device configuration of the controller 30A related to the second embodiment and the other procedures in the processing are the same as those of the controller 30 related to the first embodiment, the same configuration and the same procedures are denoted by the same reference numerals, and detailed description thereof will be omitted. The rendering unit 316 may also be referred to as a rendering processing unit in the present disclosure.

As shown in FIG. 4, the in-vehicle device 400 stores a three-dimensional model TDM showing the three-dimensional shape of the vehicle 500 in the memory 430 in advance as the object information in the present embodiment. The three-dimensional model TDM includes information indicating the real-world size of the vehicle 500.

The rendering unit 316 acquires the three-dimensional model TDM from the in-vehicle device 400 by the communication device 20 and renders the three-dimensional model TDM to acquire a two-dimensional image. In the present embodiment, the rendering unit 316 renders the three-dimensional model TDM to create four two-dimensional images of the vehicle 500 viewed in four directions such as front, rear, left, and right. The rendering unit 316 acquires feature points that exist in the transformed two-dimensional image (hereinafter referred to as "model feature points") and calculates the feature value for each model feature point. Similar to the feature point acquisition unit 311 and the scale calculation unit 312 described above, the rendering unit 316 calculates the feature values of the model feature points using a predefined type of feature algorithm. In the present embodiment, the rendering unit 316 can use three types of feature algorithms: SIFT, ORB, and SURF.

As shown in FIG. 5, in S312, the rendering unit 316 acquires the three-dimensional model TDM acquired from the in-vehicle device 400 by the communication device 20, and renders the three-dimensional model TDM to acquire a two-dimensional image.

In S322, the rendering unit 316 acquires the model feature points for the created two-dimensional image, and calculates the feature value for each model feature point. In the present embodiment, the rendering unit 316 calculates the feature values of the model feature points using any of the three available feature algorithms described above.

In S330, the scale calculation unit 312 acquires the object image feature points, and calculates the feature value for each object feature point. In the present embodiment, the scale calculation unit 312 acquires the image feature points from the image. Furthermore, the scale calculation unit 312 performs matching between the acquired image feature points and the model feature points, and acquires image feature points, which are similar to the positional relationship of the model feature points or the feature values of the model feature points, as the object image feature points. The scale calculation unit 312 calculates the feature values of the image feature points and the object image feature points using the same type of feature algorithm that was used to calculate the feature values of the model feature points.

In S340, the scale calculation unit 312 calculates the actual scale using the feature values of the model feature points and the feature values of the image object image feature points. More specifically, the scale calculation unit 312 calculates the actual scale by calculating the ratio of a first distance and a second distance. The first distance is a distance between the multiple model feature points, and the second distance is a distance between the multiple image object feature points corresponding to the multiple model feature points.

According to the controller 30A related to the second embodiment described above, a three-dimensional model TDM of the vehicle 500 is acquired as the object information, and the actual scale is calculated using the feature values of the model feature points and the feature values of the object image feature points acquired by rendering the three-dimensional model TDM. For this reason, it is possible to calculate the feature values of the model feature points and feature values of the object image feature points using any feature algorithm, and compared to the mode of referring to the feature values calculated using a predetermined type of feature algorithm. Therefore, it can suppress the inability to calculate the actual scale due to a mismatch in feature algorithms. In addition, the actual scale can be calculated using the feature values of the feature points at arbitrary positions on the vehicle 500, as compared with the mode in which the feature values of the feature points at predefined positions of the vehicle 500 are acquired.

Third Embodiment

The controller 30 related to the third embodiment differs from the controller 30 related to the first embodiment such that: the controller 30 related to the third embodiment further acquires the position of the vehicle 500 from the in-vehicle device 400 as the object information; and the controller 30 related to the third embodiment performs bundle adjustment in S40 of the actual scale calculation process using the position of the vehicle 500. Since the device configuration of the controller 30 related to the third embodiment and the other procedures in the processing are the same as those of the controller 30 related to the first embodiment, the same configuration and the same procedures are denoted by the same reference numerals, and detailed description thereof will be omitted.

In the present embodiment, the vehicle 500 has various sensors (not shown) that can be used to detect the position and attitude of the vehicle 500, such as the GNSS receiver, IMU, and LiDAR. The in-vehicle device 400 transmits the position of the vehicle 500 in addition to the feature information FI described above to the controller 30 as the object information.

In S40 shown in FIG. 2, the self-position estimation unit 313 performs bundle adjustment using the position of the vehicle 500 acquired as the object information to correct the reprojection error to the image feature points. More specifically, in the bundle adjustment, the self-position estimation unit 313 estimates the three-dimensional coordinates of the subject corresponding to image feature points among consecutive images in a time series based on the correspondence relation of the image feature points. The self-position estimation unit 313 then re-projects the three-dimensional coordinates of the subject corresponding to the image feature points onto the image plane based on the self-position of the vehicle 200 when each image was acquired, in other words, the position and orientation of the camera 10. The self-position estimation unit 313 corrects the self-position of the vehicle 200 when each image is acquired so that the reprojection error, calculated as the distance between the reprojection point and the image feature point, is minimized.

Normally, in the bundle adjustment, the self-position estimation unit 313 calculates the re-projection error by referring to the image feature points corresponding to the background area, based on the assumption that the background area of an image showing fixed objects, such as roads and buildings, does not move in the real world. However, the above assumption does not hold true because the vehicle 500 moves between consecutive images in a time series. Therefore, if the position of vehicle 500 is not utilized, the real-world coordinates of the corresponding image feature points for the vehicle 500 are unknown. As a result, the self-position estimation unit 313 cannot reference the image feature points corresponding to vehicle 500 and only calculates the reprojection error using the image feature points corresponding to the background area. In contrast, when utilizing the position of the vehicle 500, it is possible to determine the real-world coordinates of the corresponding points of the image features of the vehicle 500. Therefore, the self-position estimation unit 313 can calculate the reprojection error by referring to not only the image feature points corresponding to the background but also the image feature points corresponding to the vehicle 500. In this way, when utilizing the position of the vehicle 500 as object information, compared to the case where the position of vehicle 500 is not utilized, it is possible to calculate the reprojection error by referring to a greater number of image feature points, and thus more effectively suppress the decrease in self-position estimation accuracy.

According to the controller 30 according to the third embodiment, effects similar to the effects of the first embodiment can be acquired. Furthermore, by acquiring object information that includes the position of the vehicle 500 and performing additional processing to correct the reprojection error to the image feature points using bundle adjustment with the utilization of the position of the vehicle 500, it is possible to further suppress the decrease in self-position estimation accuracy.

Other Embodiments

In one or more of the above embodiments, the controller 30 is adapted to the vehicle 200, but the present disclosure is not limited this example. The controller 30 may be adapted to any movable object such as an aircraft, robot, or vessel. Similarly, the in-vehicle device 400 may be adapted to any movable object such as an aircraft, robot, or vessel.

In one or more of the above embodiments, the camera 10 is a monocular camera, but the present disclosure is not limited to this example. The camera 10 may be a stereo camera. In such a configuration, the self-position estimation unit 313 may use stereo matching to calculate the three-dimensional position of each image feature point. This feature also provides the same effects as the above embodiments. Furthermore, since it is possible to compare the actual scale that can be calculated by stereo matching with the actual scale calculated by the above-mentioned process of the scale calculation unit 312, it is possible to calculate the actual scale more accurately and further suppress the decrease in self-position estimation accuracy.

In one or more of the above embodiments, the controller 30 is an ECU having the CPU 31, but the present disclosure is not limited to this example. The controller 30 may be configured as a System on Chip (SoC) with a GPU (Graphics Processing Unit), NPU (Neural Network Processing Unit), DSP (Digital Signal Processor), or other similar components, instead of the CPU 31. Such a configuration also provides the same effects as the above embodiments.

In one or more of the above embodiments, the feature point acquisition unit 311, the scale calculation unit 312, the self-position estimation unit 313, the route planning unit 314, and the vehicle control unit 315 are implemented in the same ECU, but the present disclosure is not limited to this example. For example, the ECU that implements the feature point acquisition unit 311, the scale calculation unit 312, and the self-position estimation unit 313, which are functional units that realize self-position estimation, and the ECU that implements the route planning unit 314 and the vehicle control unit 315, which are functional units that realize vehicle control using the estimated self-position, may be provided independently of each other. In such a configuration, the ECU that realizes the feature point acquisition unit 311, the scale calculation unit 312, and the self-position estimation unit 313 corresponds to the "self-position estimation device" in the present disclosure.

In one or more of the above embodiments, the feature point acquisition unit 311 and the scale calculation unit 312 can each utilize three types of feature algorithms: SIFT, ORB, and SURF. However, the present disclosure is not limited to these algorithms. The feature point acquisition unit 311 and the scale calculation unit 312 may utilize different types of feature algorithms. Moreover, the types of feature algorithms are not limited to the aforementioned three types, and any known feature algorithms such as Histograms of Oriented Gradients (HOG) or Convolutional Neural Network (CNN) may be utilized. The number of feature algorithms available to the feature point acquisition unit 311 and the scale calculation unit 312 may be two, or four or more. Such a configuration also provides the same effects as the above embodiments. The feature algorithm may also be referred to as feature point algorithm in the present disclosure.

The scale calculation unit 312 may utilize only one type of feature algorithm. In such a configuration, the scale calculation unit 312 may calculate the actual scale when the received feature information FI indicates a type of feature algorithm that is available for use. Even with such a configuration, if the received feature information FI indicates a type of feature algorithm that is available for use, the actual scale can be calculated. Accordingly, a decrease in self-position estimation accuracy can be suppressed.

In one or more of the above embodiments, the scale calculation unit 312 acquires the object information from the in-vehicle device 400 adapted to the vehicle 500, but the present disclosure is not limited to this example. The scale calculation unit 312 may acquire either the feature information FI or the three-dimensional model TDM of the object and the position of the object as the object information from an external device adapted to a geographic feature such as a sign or traffic light preliminarily provided in the vicinity of the vehicle 200.

In one or more of the above embodiments, the controller 30 repeatedly executes the process shown in FIG. 2 while the controller 30 is in operation, but the present disclosure is not limited to this example. The controller 30 may start or stop the processing shown in FIG. 2 according to the driving environment of the vehicle 200. For example, when the vehicle 200 detects the position of the own vehicle by receiving positioning information from a GNSS receiver, the controller 30 may start the processing shown in FIG. 2 in environments such as urban areas or tunnels where stable reception of positioning information is not possible, and may end the processing when stable reception of positioning information becomes possible. According to such a configuration, in driving environments where self-positioning is possible using positioning information, the processing shown in FIG. 2 is not executed, thereby suppressing an increase in power consumption in the controller 30.

In one or more of the above embodiments, as shown in FIG. 2, the controller 30 executes S30 after S20, but the present disclosure is not limited to this example. The controller 30 may execute S30 in parallel with S20. According to such a configuration, multiple processes can be executed in parallel, enabling efficient execution of processes in the controller 30.

In one or more of the above embodiments, the scale calculation unit 312 selects a vehicle that prioritizes acquiring object feature points when multiple vehicles are present in the image, but the present disclosure is not limited to this example. The scale calculation unit 312 may acquire object feature points for multiple vehicles present in the image and calculate the actual scale. According to such a configuration, compared to the configuration that acquires object feature points for one vehicle, it is possible to calculate the actual scale using a larger number of object feature points. As a result, it is possible to calculate the actual scale more accurately and suppress a decrease in self-positioning estimation accuracy to a greater extent.

In one or more of the above embodiments, the scale calculation unit 312 transmits available feature algorithms to the in-vehicle device 400, and the in-vehicle device 400 transmits the feature values calculated by multiple types of feature algorithms for each object feature point, out of which the scale calculation unit 312 can use one type of feature algorithm. However, the present disclosure is not limited to this example. The in-vehicle device 400 may transmit feature values calculated by two or more types of feature algorithms, out of the multiple feature values calculated by multiple types of feature algorithms for each object feature point, that are available for use by the scale calculation unit 312. According to such a configuration, it is possible to suppress a decrease in freedom of selecting the types of feature algorithms used by the scale calculation unit 312.

The in-vehicle device 400 may transmit the feature values calculated by two or more types of feature algorithms, respectively, for the object feature points, regardless of the types of feature algorithms available to the scale calculation unit 312. If there are multiple feature algorithms available for calculating each of the multiple features received as the feature information FI, the scale calculation unit 312 may determine the type of feature algorithm to be used according to a predetermined priority order. The determined type of feature algorithm can be used to calculate the feature values of the object image feature points, which are calculated using the determined type of feature algorithm, and the feature values of the object feature points. Subsequently, the actual scale can be calculated. For example, if prioritizing the accuracy of self-positioning estimation, the priority order may be determined to preferentially use SIFT as the feature algorithm. On the other hand, if prioritizing the reduction of computational load, the priority order may be determined to preferentially use ORB as the feature algorithm. The priority order may be defined in any order regardless of the above. According to such a configuration, it becomes easier to determine which type of feature algorithm to use when multiple feature values calculated by two or more types of feature algorithms are transmitted for each object feature point.

In one or more of the above embodiments, the feature point acquisition unit 311 and the scale calculation unit 312 each acquire an image, extract the image feature points and the object image feature points using the feature algorithm, and calculate the feature values. However, the present disclosure is not limited to this example. It is also possible for only the feature point acquisition unit 311 to acquire the image, extract the image feature points and the object image feature points, and calculate their respective feature values. The scale calculation unit 312 may calculate the actual scale using the object image feature points acquired by the feature point acquisition unit 311. In other words, the scale calculation unit 312 may directly acquire the object feature points from the feature point acquisition unit 311 without utilizing the feature algorithm. In such a configuration, the feature point acquisition unit 311, similar to the scale calculation unit 312 in one or more of the above embodiments, can communicate with the in-vehicle device 400 to determine the types of feature algorithms that are available for use. In this configuration, since only the feature point acquisition unit 311 utilizes the feature algorithm to acquire image feature points and object image feature points, and the scale calculation unit 312 acquires object feature points directly from the feature point acquisition unit 311 without utilizing the feature algorithm, it is possible to suppress an increase in computational load on the controller 30.

In the above embodiments, the rendering unit 316 renders the three-dimensional model TDM to create four two-dimensional images of the vehicle 500 viewed in the front, rear, left, and right directions. However, the present disclosure is not limited to this example. The rendering unit 316 may create eight two-dimensional images of the vehicle 500 viewed in eight directions, including diagonal directions in addition to front, rear, left, and right directions. In such a configuration, it is possible to suppress an increase in the difference between the attitude of the vehicle 500 in the two-dimensional images created by rendering and the posture of the vehicle 500 in the images acquired by the camera 10. This helps to reduce the complexity of the rotation processing and matching between the model feature points and the object image feature points.

Additionally, the rendering unit 316 may create only one two-dimensional image of the vehicle 500 viewed in one pre-determined direction. It may be preferable that the attitude of the vehicle 500 in the two-dimensional image is a posture that is highly likely to be observed in the images acquired by the camera 10. For example, the attitude of the vehicle 500 in the two-dimensional image viewed from the rear of the three-dimensional model TDM is more likely to be observed in the images acquired by the camera 10 compared to the attitude in the two-dimensional image viewed in a diagonal direction. According to such a configuration, it is possible to suppress an increase in computational load during the rendering process by reducing the number of two-dimensional images created.

In one or more of the above embodiments, the controller 30 acquires the feature information FI and the position of the vehicle 500 as the object information to perform self-position estimation, but the present disclosure is not limited to this example. The controller 30 may perform the self-position estimation by acquiring only the position of the vehicle 500 as the object information. For example, the scale calculation unit 312 may calculate the actual scale by calculating the ratio between the movement of the vehicle 500 in pixel units in multiple consecutive images in a time series and the movement of the vehicle 500 in reality, and the self-position estimation unit 313 may perform the self-position estimation using the actual scale. For example, the "movement of the vehicle 500 per pixel" is acquired by calculating the displacement of the positional relationship between the image feature point corresponding to the vehicle 500 and the image feature point corresponding to the background portion of each image. In such a configuration, the correspondence between the vehicle existing in the image and the vehicle for which position information was transmitted can be identified by, for example, comparing the absolute position of the vehicle 500 calculated by image analysis and the position of the vehicle 500 acquired as the object information. The calculation of the absolute position of the vehicle 500 by image analysis can be achieved by using the relative position between the vehicle 200 and the vehicle 500 calculated by the image analysis and the absolute position of the vehicle 200. The absolute position of the vehicle 200 can be calculated according to the relative movement calculated by image analysis from the point where the positioning information was interrupted, when the absolute position of the vehicle 200 was detected at some point in the past by the positioning information, as described above. According to such a configuration, only the position of the vehicle 500 can be used as the object information to perform the self-position estimation to reduce the amount of information to be acquired from the in-vehicle device 400 as the object information.

The controller 30 and the techniques thereof according to the present disclosure may be implemented by one or more special-purposed computers. Such a special-purposed computer may be provided (i) by configuring (a) a processor and a memory programmed to execute one or more functions embodied by a computer program, Alternatively, the controller 30 and method thereof according to the present disclosure may be achieved by a dedicated computer provided by constituting a processor with one or more dedicated hardware logic circuits. Alternatively, the controller 30 and the method thereof according to the present disclosure may be achieved using one or more dedicated computers constituted by a combination of a processor and a memory programmed to execute one or more functions and a processor formed of one or more hardware logic circuits. In addition, the computer program may be stored in a computer-readable non-transition tangible recording medium as an instruction to be executed by a computer.

The present disclosure should not be limited to the embodiments described above, and various other embodiments may be implemented without departing from the scope of the present disclosure. For example, the technical features in each embodiment corresponding to the technical features in the form described in the summary may be used to solve some or all of the above-described issues, or to provide one of the above-described effects. In order to achieve a part or all, replacement or combination can be appropriately performed. Also, some of the technical features may be omitted as appropriate.

What is claimed is:

1. A self-position estimation device adapted to a movable object having a camera and a communication device, the camera configured to take an image of surrounding of the movable object, the self-position estimation device configured to estimate a self-position of the movable object, the self-position estimation device comprising:

a feature acquisition unit configured to acquire an image feature point being a feature point existing in the image being taken by the camera;

a scale calculation unit configured to execute calculation of an actual scale of the image; and a self-position estimation unit configured to estimate the self-position based on the image feature point and the actual scale, wherein the scale calculation unit is configured to execute the calculation by:

acquiring object information related to an object existing in the image on condition that a distance between the object and the movable object is shorter than a predetermined distance, the object information being acquired by the communication device from an external device located at object;

acquiring an object image feature point being the feature point included in the image feature point, the object image feature point being related to the object corresponding to the object information; and calculating the actual scale based on a feature value of the object image feature point and the object information.

2. The self-position estimation device according to claim 1, wherein the object is another movable object located at the surrounding of the movable object.

3. The self-position estimation device according to claim 2, wherein the object information includes a position of the object, and the self-position estimation unit is further configured to correct a reprojection error for the image feature point through bundle adjustment, based on the position of the object.

4. The self-position estimation device according to claim 1, wherein the external device is adapted to a local element located at the surrounding of the movable object.

5. The self-position estimation device according to claim 4, wherein the object information includes a position of the object, and the self-position estimation unit is further configured to correct a reprojection error to the image feature point through bundle adjustment, based on the position of the object.

6. The self-position estimation device according to claim 1, wherein the object information includes feature information being indicative of:

a position of each of object feature points being feature points corresponding to at least one section of the object;

the feature value of each of the object feature points; and a type of feature algorithm adopted for calculating the feature value of each of the object feature points, and the scale calculation unit is configured to execute the calculation by:

acquiring the object image feature point included in the image feature point, the object image feature point being a feature point corresponding to the object feature points; and calculating the actual scale based on the feature value of the object image feature point and the feature value of each of the object feature points.

7. The self-position estimation device according to claim 6, wherein the external device is configured to:

preliminarily store feature values for each of the object feature points, the feature values being calculated by different types of feature algorithms, respectively;

determine, in collaboration with at least one of the feature acquisition unit or the scale calculation unit, whether to transmit as the feature information a feature value calculated by a type of feature algorithm among the different types of feature algorithms for each of the object feature points; and transmit a determined feature value as the feature information to the communication device from the feature values for each of the object feature points, based on a condition that the external device determines to transmit the determined feature value as the feature information being calculated by a determined type of feature algorithm among the different types of feature algorithms.

8. The self-position estimation device according to claim 6, wherein the external device is configured to:

preliminarily store feature values for each of the object feature points, the feature values being calculated by different types of feature algorithms, respectively; and transmit at least two of the feature values as the feature information to the communication device for each of the object feature points, the at least two of the feature values being calculated by at least two of the different types of feature algorithms, respectively.

9. The self-position estimation device according to claim 6, wherein the scale calculation unit is capable of adopting different types of feature algorithms, the scale calculation unit is configured to execute the calculation in which the feature value of the object image feature point is calculated by a same type of feature algorithm adopted for calculating the feature value of each of the object feature points, and the feature value of each of the object feature points is received as the feature information by the scale calculation unit.

10. The self-position estimation device according to claim 6, wherein the scale calculation unit is capable of adopting different types of feature algorithms, the external device is configured to:

preliminarily store feature values for each of the object feature points, the feature values being calculated by the different types of feature algorithms, respectively;

transmit at least two of the feature values as the feature information to the communication device for each of the object feature points, the at least two of the feature values being calculated by at least two of the different types of feature algorithms, respectively, the scale calculation unit is further configured to determine a determined type of feature algorithm from the at least two of the different types of the feature algorithms according to a predetermined priority order, based on a condition that the at least two of the different types of feature algorithm are adoptable by the scale calculation unit, and the scale calculation unit is configured to execute the calculation in which the feature value of the object image feature point is calculated by the determined type of feature algorithm adopted for calculating the feature value of each of the object feature points, based on a condition that the scale calculation unit determines the determined type of feature algorithm.

11. The self-position estimation device according to claim 1, wherein the object information includes a three-dimensional model of the object, the self-position estimation device further comprising:

a rendering unit configured to render the three-dimensional model to acquire a model feature point as a feature point included in the three-dimensional model, wherein the scale calculation unit is configured to acquire the object image feature point from the image feature point, the object image feature point being a feature point corresponding to the model feature point, and the scale calculation unit is configured to execute the calculation, based on the feature value of the object image feature point and a feature value of the model feature point.

12. A self-position estimation device adapted to a movable object having a camera and a communication device, the camera configured to take an image of surrounding of the movable object, the self-position estimation device configured to estimate a self-position of the movable object, the self-position estimation device comprising:

at least one processor and at least one memory that stores instructions configured to, when executed by the at least one processor, cause the at least one processor to:

acquire an image feature point as a feature point existing in the image being taken by the camera;

estimate the self-position based on the image feature point and an actual scale of the image;

execute calculation of an actual scale of the image; and estimate the self-position based on the image feature point and the actual scale; and execute calculation of the actual scale by acquiring object information by the communication device from an external device on condition that a distance between an object and the movable object is shorter than a predetermined distance, the object information being information related to the object existing in the image, the external device being located at the object;

acquiring an object image feature point being a feature point included in the image feature point, the object image feature point being a feature point related to the object corresponding to the object information; and calculating the actual scale based on a feature value of the object image feature point and the object information.

13. The self-position estimation device according to claim 1, wherein the object information includes feature information being indicative of a position of each of a plurality of object feature points being feature points corresponding to at least one section of the object, the object image feature point is one of a plurality of object image feature points, an object feature point is one of the plurality of object feature points, and the scale calculation unit is configured to calculate the actual scale by calculating a ratio of (i) a distance between two or more of the plurality of object feature points specified by the object information to (ii) a distance between two or more of the plurality of object image feature points, the plurality of object image feature points corresponding to the plurality of object feature points.

14. The self-position estimation device according to claim 12, wherein the object information includes feature information being indicative of:

a position of each of object feature points being feature points corresponding to at least one section of the object;

a the feature value of each of the object feature points; and a type of feature algorithm adopted for calculating the feature value of each of the object feature points, and the at least one processor and at least one memory is configured to execute the calculation by:

acquiring the object image feature point included in the image feature point, the object image feature point being a feature point corresponding to the object feature points; and calculating the actual scale based on the feature value of the object image feature point and the feature value of each of the object feature points.

15. The self-position estimation device according to claim 14, wherein the at least one processor and at least one memory is configured to:

preliminarily store feature values for each of the object feature points, the feature values being calculated by different types of feature algorithms, respectively;

determine whether to transmit as the feature information a feature value calculated by a type of feature algorithm among the different types of feature algorithms for each of the object feature points; and transmit a determined feature value as the feature information to the communication device from the feature values for each of the object feature points, based on a condition that the external device determines to transmit the determined feature value as the feature information being calculated by a determined type of feature algorithm among the different types of feature algorithms.

16. The self-position estimation device according to claim 14, wherein the external device is configured to:

preliminarily store feature values for each of the object feature points, the feature values being calculated by different types of feature algorithms, respectively; and transmit at least two of the feature values as the feature information to the communication device for each of the object feature points, the at least two of feature values being calculated by at least two of the different types of feature algorithms, respectively.

17. The self-position estimation device according to claim 14, wherein the at least one processor and at least one memory is configured to:

adopt different types of feature algorithms, execute the calculation in which the feature value of the object image feature point is calculated by a same type of feature algorithm adopted for calculating the feature value of each of the object feature points, and store the feature value of each of the object feature points that is received as the feature information.

18. The self-position estimation device according to claim 14, wherein the at least one processor and at least one memory is configured to adopt different types of feature algorithms;

the external device is configured to:

preliminarily store feature values for each of the object feature points, the feature values being calculated by the different types of feature algorithms, respectively;

transmit at least two of the feature values as the feature information to the communication device for each of the object feature points, the at least two of the feature values being calculated by at least two of the different types of feature algorithms, respectively, the at least one processor and at least one memory is further configured to:

determine a determined type of feature algorithm from the at least two of the different types of the feature algorithms according to a predetermined priority order, based on a condition that the at least two of the different types of feature algorithm are adoptable, and execute the calculation in which the feature value of the object image feature point is calculated by the determined type of feature algorithm adopted for calculating the feature value of each of the object feature points, based on a condition that the at least one processor and at least one memory determines the determined type of feature algorithm.

19. The self-position estimation device according to claim 12, wherein the object information includes feature information being indicative of a position of each of a plurality of object feature points being feature points corresponding to at least one section of the object, the object image feature point is one of a plurality of object image feature points, an object feature point is one of the plurality of object feature points, and the at least one processor and at least one memory is configured to calculate the actual scale by calculating a ratio of (i) a distance between two or more of the plurality of object feature points specified by the object information to (ii) a distance between two or more of the plurality of object image feature points, the plurality of object image feature points corresponding to the plurality of object feature points.

* * * * *